(12) United States Patent
Pearse et al.

(10) Patent No.: US 9,874,640 B2
(45) Date of Patent: Jan. 23, 2018

(54) AUTOMATED METHODS FOR SUPPRESSION OF SPURIOUS SIGNALS

(71) Applicant: Spirent Communications PLC, Crawley, West Sussex (GB)

(72) Inventors: Neil Christopher Pearse, Paignton (GB); Steve Michael Moroz, Paignton (GB); Mark Geoffrey Holbrow, Paignton (GB)

(73) Assignee: Spirent Communications, PLC, Crawley (GB)

( * ) Notice: Subject to any disclaimer, the term of this patent is extended or adjusted under 35 U.S.C. 154(b) by 525 days.

(21) Appl. No.: 14/461,093

(22) Filed: Aug. 15, 2014

(65) Prior Publication Data

US 2016/0047916 A1    Feb. 18, 2016

(30) Foreign Application Priority Data

Aug. 15, 2014   (GB) .................................. 1414517.1

(51) Int. Cl.
*G01S 19/21*    (2010.01)
*G01S 19/23*    (2010.01)
*G01S 19/00*    (2010.01)

(52) U.S. Cl.
CPC .............. *G01S 19/21* (2013.01); *G01S 19/23* (2013.01)

(58) Field of Classification Search
CPC .......... G01S 19/01; G01S 19/13; G01S 19/21; G01S 19/23; G01S 19/24; G01S 19/243; G01S 19/235; G06F 1/02; G06F 1/022; G06F 1/03; G06F 1/0321; G06F 1/04; G06F 1/10; H03L 7/06; H03L 7/16; H03L 7/22
See application file for complete search history.

(56) References Cited

U.S. PATENT DOCUMENTS 5,093,800 A  *  3/1992  Ifune ........................ G01S 19/23
                                                          703/13
5,757,239 A  *  5/1998  Gilmore ..................... H03L 7/22
                                                          327/105

(Continued)

OTHER PUBLICATIONS

United Kingdom Search/Exam Report for Patent Application No. 1414517.1 dated Mar. 20, 2015.

(Continued)

*Primary Examiner* — Bernarr E Gregory
(74) *Attorney, Agent, or Firm* — Haynes Beffel & Wolfeld LLP

(57) ABSTRACT

An automated method is provided for suppressing spurious signals in a direct digital synthesized signal. To determine magnitudes of local oscillator ("LO") feedthrough and image frequency signal components, a digitally synthesized RF signal is digitally analyzed. To reduce the magnitude of the LO feedthrough signal component, one or more first parameters of at least one digital-to-analog converter is automatically adjusted using a first search pattern. To reduce the magnitude of image frequency signal component, at least one second parameter of the at least one digital-to-analog converter is automatically adjusted and at least one third parameter of a phase compensation network is automatically adjusted using a second search pattern. The automatically adjusting for the LO feedthrough signal component and for the image frequency signal component can be iterated.

30 Claims, 11 Drawing Sheets

(56) References Cited

U.S. PATENT DOCUMENTS

| | | | | |
|---|---|---|---|---|
| 6,760,582 B2* | 7/2004 | Gaal | ................... | G01S 19/23 |
| | | | | 342/165 |
| 7,797,132 B1* | 9/2010 | Lele | ................... | G01S 19/23 |
| | | | | 702/181 |
| 7,826,994 B2* | 11/2010 | Fu | ................... | G01S 19/235 |
| | | | | 702/108 |
| 9,002,916 B1* | 4/2015 | Ensinger | ................... | G06F 1/10 |
| | | | | 708/271 |
| 9,383,450 B2* | 7/2016 | Kim | ................... | G01S 19/23 |
| 2009/0098835 A1 | 4/2009 | Zellweger et al. | | |

OTHER PUBLICATIONS

Analog Devices AD9122, Dual, 16-Bit, 1230 MSPS, TxDAC + Digital-to-Analog Converter 2009-2011.
Analog Devices ADL5375, 400 MHz to 6 GHz Broadband Quadrature Modulator, 2007-2014, pp. 1-36.
Analog Devices, Dual, 12-/14-/16-Bit, 1 GSPS Digital-to-Analog Converters, 2007-2008, pp. 1-56.

* cited by examiner

FIG. 2: Channel Bank

FIG. 3: Digital Signal Processing Portion of a Channel Bank

FIG. 4: Analogue Signal Processing Portion of a Channel Bank

FIG. 5: Digital to Analogue Converter Functional Block Diagram

FIG. 6: RF Upconverter Power Control, Channel Summation and Phase Correction Blocks

AUTOMATED METHODS FOR SUPPRESSION OF SPURIOUS SIGNALS

PRIORITY APPLICATION

This application claims the benefit of the following commonly owned application: United Kingdom Application No. 1414517.1 entitled Automated Methods for Suppression of Spurious Signals, filed the same day as this application. The commonly owned application is hereby incorporated by reference as if fully set forth herein for all purposes.

BACKGROUND

Field

Global Navigation Satellite System (GNSS) Simulators are test tools that are able to create Radio Frequency (RF) signals that are practically indistinguishable from the signals that would be received from an actual constellation of moving earth-orbiting navigation satellites at a given location, date and time.

Simulators create the illusion of a time-delayed signal representing the transit time of the signal transmission from a satellite thousands of kilometers away from the receiver with appropriate signal level. The simulator can superimpose many real-world effects such as dispersion of the signal due to the electrically-charged ionosphere leading to signal timing delay and the effects of reception antenna gain and phase variation as a function of arrival angle at the antenna.

On state-of-the-art GNSS simulators virtually all of these real-world degradations are under the control of the user via a software control interface to a series of mathematical models. On such simulators the fidelity of the signals is of prime importance, to ensure that the signals are as representative of signals from actual satellites as possible. Important characteristics for preserving signal fidelity include carrier frequency, Doppler shift due to relative motion between the satellite and the simulated receiver trajectory, power level, bandwidth, modulation pattern, group delay and spectral purity.

In order to create numerous dynamic GNSS signals with high fidelity it is necessary to use Direct Digital Synthesis (DDS) techniques, in which the signal is defined in the digital domain and converted into the analogue/RF domain by a digital-to-analogue converter (DAC). The signals are usually defined separately in terms of their in-phase and quadrature (IQ) components, each of which has a DAC assigned.

In DDS the signal for each satellite is created as a stream of digital samples at the design sample rate. The samples themselves are created mathematically from the definition of the signal. The mathematics can be implemented using logic elements embedded within Field Programmable Gate Arrays (FPGA), Digital Signal Processors (DSP) or as software in a Central Processing Unit (CPU), usually calculated in real time. Many signals can be combined in the digital domain by simply adding the digital sample words together.

The analogue IQ signals from a pair of DACs are applied to the analogue local oscillator signal using an analogue modulator. The carrier signal at the modulator output can be the final RF frequency or an Intermediate Frequency (IF) which is later up-converted to the required final RF.

This DDS technique addresses all the characteristics of the signals in a highly efficient manner, creating Doppler shift, modulation, and signal power level, constraining bandwidth, and applying group delay. However, the IQ modulation process introduces unwanted artefacts to the signals generated, affecting spectral purity.

In particular, two main degradations which would not be present in a live signal are local oscillator (LO) feedthrough and image. The local oscillator signal onto which the signal modulation is applied can feed through to the output and appear as a continuous wave (CW) at the center of the band. In one particular situation, the LO can generate the exact carrier frequency and the modulator is not required to offset the LO frequency to generate a different carrier frequency. The LO feedthrough in this situation can be referred to as carrier feedthrough.

Also, a reduced-amplitude mirror image of the wanted signal is created with a Doppler shift equal and opposite to that of the wanted signal. At low Doppler, this image will appear in the signal.

The LO feedthrough is particularly significant when simulating signals at low levels, as its relative contribution is greater. The image is less problematic at lower signal levels as it tends to reduce as the wanted signal reduces. These artefacts are caused by imperfections in the offset, gain and phase balance between the 'I' and 'Q' inputs to the modulator and imperfections in the modulator. LO feedthrough is the result of offset errors while the image is the result of amplitude and phase imbalance.

These imperfections can be minimized by adjusting the offsets, amplitude and phase balance artificially. While coarse adjustment can remove the majority of the imperfections, very fine adjustments are required to achieve a level of suppression to match the aspiration of very high signal fidelity. Traditionally, the adjustments have been made manually through careful inspection of the signal by a human operator. Moreover, the sensitivity of these periodic adjustments to changes in temperature is quite high, resulting in a nulling process that struggles to maintain its optimum performance, especially over prolonged periods. In order to minimize the effects of ambient temperature variation the sensitive elements have traditionally been encased in a temperature controlled 'oven'. Even with this mitigation, in practice an undesirable though generally acceptable residual level of these artefacts remains.

It is desirable to provide an automated method for suppressing spurious signals in a direct digital synthesized signal.

SUMMARY

The technology disclosed provides a method to adjust and remove both LO feedthrough and unwanted image artefacts automatically from a GNSS simulator, and to be able to continuously monitor and adjust automatically while a simulation is in progress. This monitoring produces lower levels of these artefacts and much greater confidence with respect to the ability to specify and guarantee to customers the suppression level of the artefacts.

The technique employed involves coupling the RF output signal to a monitoring circuit that down-converts the signal to an intermediate analogue frequency (IF) using a local oscillator (LO) tuned to focus on both unwanted artefacts in sequence. The focus is reinforced by low pass filtering. The signal is then digitized by an analogue-to digital converter (ADC) and the resulting digital data stream is fed back into the processing element.

In the software processing element, closed loop algorithms work to minimize either the LO feedthrough or the image of one of the signals being simulated, depending on the setting of the downconverter LO. The signal in question is continuously checked in response to small adjustments in IQ offsets (for LO feedthrough) and in IQ amplitude balance and phase balance (for the image level) to minimize the unwanted artefacts.

In practice, the system operates continuously on the LO feedthrough and image suppression while the simulator is in its idle state between simulation runs, and less frequently operates on both imperfections while a simulation is in progress.

Other aspects and advantages of the technology disclosed can be seen on review of the drawings, the detailed description and the claims, which follow.

DETAILED DESCRIPTION

Figure 1:
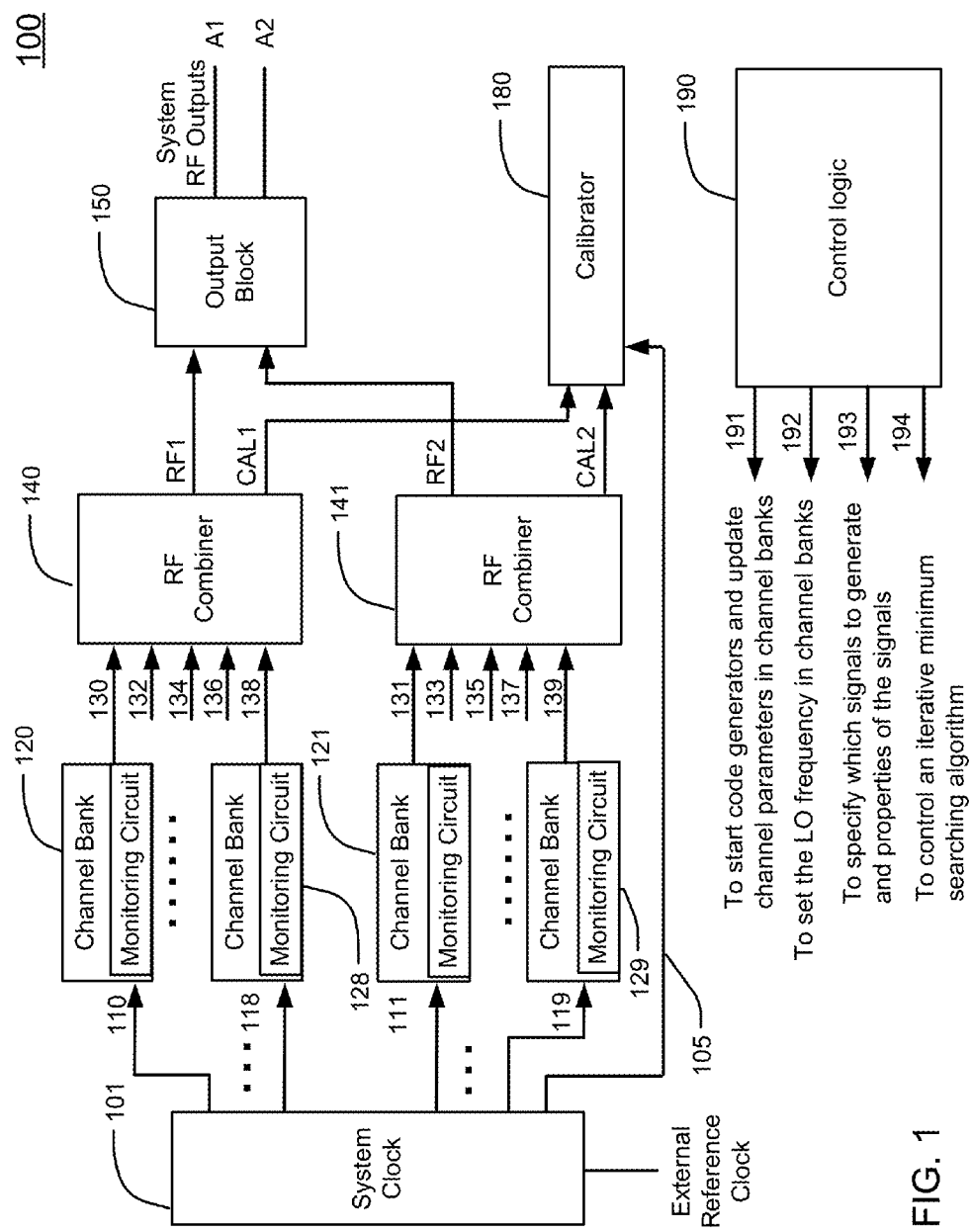
FIG. 1 is a simplified diagram illustrating an RF signal test platform, including circuitry for suppression of spurious signals.

A detailed description of implementations of the technology disclosed is provided with reference to the figures. The following description will typically be with reference to specific structural implementations and methods. It is to be understood that there is no intention to limit the invention to the specifically disclosed implementations and methods but that the invention may be practiced using other features, elements, methods and implementations. Preferred implementations are described to illustrate the present invention, not to limit its scope, which is defined by the claims. Those of ordinary skill in the art will recognize an assortment of equivalent variations on the description that follows. Like elements in various implementations are commonly referred to with like reference numerals.

FIG. 1 is a simplified diagram illustrating an RF signal test platform, including circuitry and control logic for suppression of spurious signals. The test platform includes a plurality of channel banks, including a first channel bank and additional channel banks Although only 4 channel banks (e.g. 120, 128, 121, 129) are shown in FIG. 1, the test platform can be configured with fewer than or more than 4 channel banks. In one implementation, the test platform can include 10 channel banks, and each of the channel banks can generate 16 satellite channels, so the test platform can generate 160 satellite channels.

Each of the channel banks can generate a composite RF signal consisting of 10 individual satellite signals. For instance, channel banks (e.g. 120, 128, 121, 129) can generate composite RF signals (e.g. 130, 138, 131, 139), respectively. Other channel banks (not shown) can generate other RF signals (e.g. 132, 134, 136, 133, 135, 137). The RF signal can carry a particular sequence of data at a particular data frequency for a particular signal type. A channel bank includes a Digital Signal Processing Block and an Analogue Signal Processing Block known as a Signal Modulation Block. The Digital Signal Processing Block is described in connection with FIG. 3. The Signal Modulation Block is described in connection with FIG. 4. A channel bank includes circuitry that downconverts and demodulates the RF signal produced by the Signal Modulation Block to detect the LO feedthrough and image signal components.

An RF combiner (e.g. 140) can combine RF signals generated by a group of channel banks (e.g. 130, 132, 134, 136, 138), and produce a combined RF signal RF1 and a test RF signal CAL1. A second RF combiner (e.g. 141) can combine RF signals generated by a second group of channel banks (e.g. 131, 133, 135, 137, 139), and produce a second combined RF signal RF2 and a second test RF signal CAL2. The RF signals RF1 and RF2 are fed to an output block 150 which produces a system RF output. In other configurations signals RF1 and RF2 may not be combined and the system would have multiple RF outputs, such as a first RF output A1 and a second RF output A2, each representing an antenna and containing an individual or number of RF Satellite signals, where the RF satellite signals at the multiple RF outputs are aligned by using a calibrator (e.g. 180, FIG. 1). The test RF signals CAL1 and CAL2 are fed to the calibrator 180 for RF signal alignment calibration. The test RF signals CAL1 and CAL2 experience the same delay as the combined RF signals RF1 and RF2 respectively, through a chain of electronic and electrical components starting in a channel bank where a digital signal at baseband is converted to the analogue domain by the digital to analogue converters (DAC).

Control logic 190 can select a particular channel bank to generate a particular sequence of data at a particular data frequency for a particular signal type. The control logic 190 can send a timing signal 191 to Digital Signal Processing Blocks (e.g. 230, FIG. 2) in the channel banks to start code generators in the channel banks and to update channel parameters in the channel banks. The control logic 190 can send a signal 192 to Signal Modulation Blocks (e.g. 240, FIG. 2) in the channel banks to set the LO frequency in the channel banks to a value depending on the carrier frequency being generated. The control logic 190 can send a signal 193 to Digital Signal Processing Blocks (e.g. 230, FIG. 2) in the channel banks to specify which signals to generate and properties of the signals. The control logic 190 can send a signal 194 to the processing element (e.g. 250, FIG. 2) in the channel banks to control an iterative minimum searching algorithm to minimize either the LO feedthrough or the image of one of the signals being simulated.

The control logic 190 can be implemented in computer software, in firmware, or in an integrated circuit such as a CPU (i.e. central processing unit), a field programmable gate array (FPGA), a programmable logic device (PLD), an application specific integrated circuit (ASIC), a reduced instruction set computing (RISC) device, an advanced RISC machine (ARM), a digital signal processor (DSP), etc. For instance, the control logic 190 can be implemented in the MicroBlaze soft processor core from Xilinx Inc.

A system clock generator 101 receives an external reference clock, and generates clocks (e.g. 110, 118, 111, 119) for respective channel banks (e.g. 120, 128, 121, 129). The system clock generator 101 also generates a system reference clock 105 for the calibrator 180.

Figure 2:
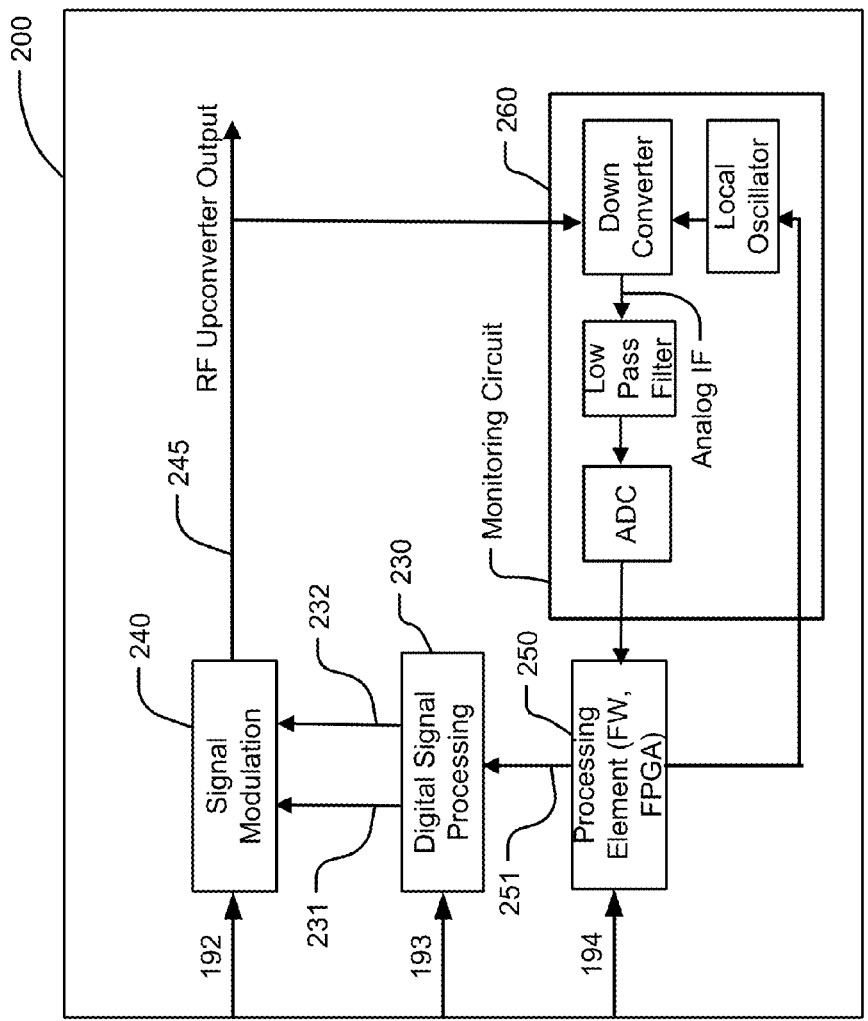
FIG. 2 is a simplified diagram illustrating a channel bank, as shown in FIG. 1.

FIG. 2 illustrates a channel bank (120, 128, 121 or 129 for example), as shown in FIG. 1. Each channel bank includes four blocks: a Digital Signal Processing Block (e.g. 230), a Signal Modulation Block (e.g. 240), a monitoring circuit (e.g. 260), and a processing element (e.g. 250). The Digital Signal Processing Block (e.g. 230) and the monitoring circuit (e.g. 260) can be implemented in digital circuits such as using logic elements embedded within Field Programmable Gate Arrays (FPGA). The processing element (e.g. 250) can be implemented in a processor such as the MicroBlaze soft processor core from Xilinx Inc.

The Digital Signal Processing Block 230 is in the digital signal processing portion of a channel bank, and produces a complex digital baseband signal (e.g. 231 and 232). The Digital Signal Processing Block 230 is further described in connection with FIG. 3.

The Signal Modulation Block 240 is in the analogue signal processing portion of a channel bank. In the Signal Modulation Block 240, a local oscillator (i.e. a frequency synthesizer) is responsive to the baseband frequency being chosen for upconversion to the satellite constellation being simulated. Digital to analogue converters convert the complex digital baseband signals 231 and 232 into analogue baseband I component and Q component. An analogue modulator receives both the baseband I component and the baseband Q component, and produces a complex modulated carrier signal. The Signal Modulation Block 240 produces an RF output signal 245, and is further described in connection with FIG. 4.

The RF output signal 245 is coupled to the monitoring circuit 260 that down-converts the signal to an intermediate analogue frequency (IF) using a local oscillator (LO) tuned to focus on both unwanted artefacts in sequence. The focus is reinforced by low pass filtering. The signal is then digitized by an analogue-to digital converter (ADC) and the resulting digital data stream is fed back into the processing element 250.

In the processing element 250, closed loop algorithms work to minimize either the LO feedthrough or the image of one of the signals being simulated, depending on the setting of the downconverter LO. The signal in question is continuously checked in response to small adjustments in IQ offsets (for LO feedthrough) and in IQ amplitude balance and phase balance (for the image level) to minimize the unwanted artefacts. The processing element 250 produces a control signal 251 to set the DAC I/Q offsets, gain and phase correction.

Figure 3:
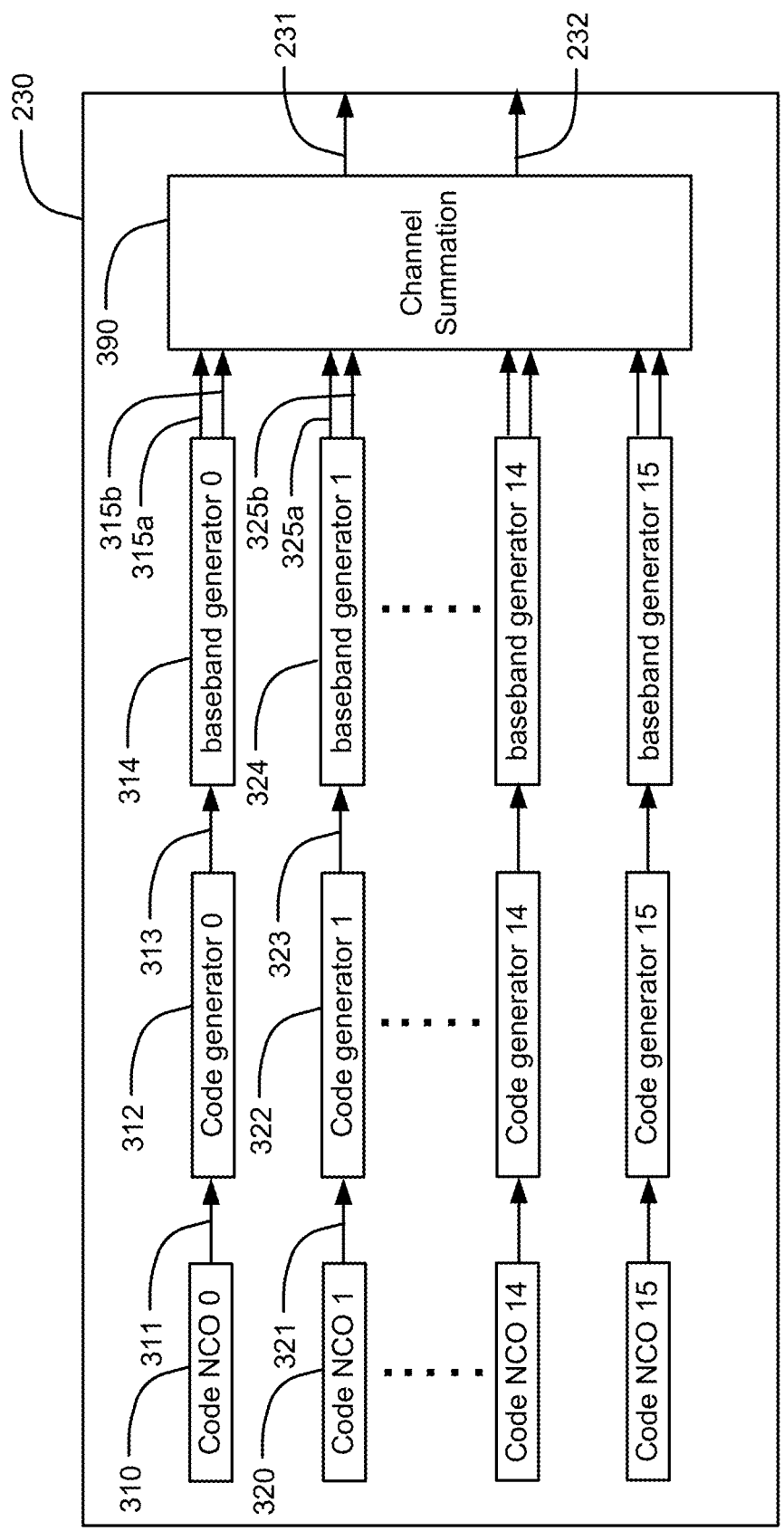
FIG. 3 is a simplified diagram illustrating the digital signal processing portion of a channel bank, as shown in FIG. 2.

FIG. 3 is a simplified diagram illustrating a Digital Signal Processing Block 230 in the digital signal processing portion of a channel bank. Each channel bank includes multiple code generators, such as 16 code generators, and thus can generate multiple codes simultaneously. For purposes of RF signal alignment calibration, a particular code at a particular carrier frequency on a particular channel bank is generated at a time. Corresponding to 16 code generators, a channel bank includes 16 code NCOs (numerically controlled oscillators), and 16 baseband generators.

A code NCO (e.g. 310, 320) can provide a code rate via a signal (e.g. 311, 321) to a code generator (e.g. 312, 322). The code generator can generate a code via a signal (e.g. 313, 323), such as a sequence of data suitable for determining a timing offset between two signals. The code has a code length, referred to as a code epoch. In one implementation, the sequence of data can be generated using a LFSR (i.e. linear feedback shift register). The LFSR can be used as a pseudo-random number generator which can have a relatively long cycle without repeating itself. In one implementation, the 16 code generators in each channel bank can be implemented in FPGAs (field programmable gate arrays).

A baseband generator (e.g. 314, 324) receives the code on signal 313 from the code generator (e.g. 312, 322), and generates a digital complex data signal at baseband including I and Q components (e.g. 315*a*, 315*b*, 325*a*, 325*b*), transmitting the particular sequence of data at a particular data frequency for a particular signal type. The digital data signal can also include navigation data for a satellite channel.

Digital data signals (e.g. 315*a*, 315*b*, 325*a*, 325*b*) at baseband generated by the baseband generators (e.g. 314, 324) can be digitally combined by a channel summation circuit (e.g. 390) to produce a complex digital baseband signal (e.g. 231 and 232) for Signal Modulation Block in the channel bank, as described in connection with FIG. 4. The channel summation circuit 390 is further described in connection with FIG. 6.

A particular signal type is associated with a constellation type, a constellation type can have one or more carriers, and each carrier has its carrier frequency. A timing offset can be used for each channel bank/carrier frequency combination. If the test platform is configured with 10 channel banks, and each channel bank can generate 12 signal types, then a total of 120 timing offsets need to be determined. Once the timing offsets are determined, the test platform can store the timing offsets for each channel bank/carrier frequency combination. Table 1 illustrates center frequencies in MHz for a combination of constellation/carrier combinations (i.e. signal types). For instance, for constellation type GPS and carrier L1, the center frequency is 1575.42 MHz.

TABLE 1

| Signal Type | Center frequency (MHz) |
| --- | --- |
| GPS L1 | 1575.42 |
| Galileo E1 | |
| GPS L2 | 1227.6 |
| GPS L5 | 1176.45 |
| GLONASS L5 | |
| Galileo E5ab | 1191.795 |
| Galileo E6 | 1278.75 |
| GLONASS F1 F0 | 1602.00 |
| GLONASS F2 F0 | 1246.00 |
| BeiDou B1 | 1561.098 |
| BeiDou B2 | 1207.14 |
| BeiDou B3 | 1268.52 |

Figure 4:
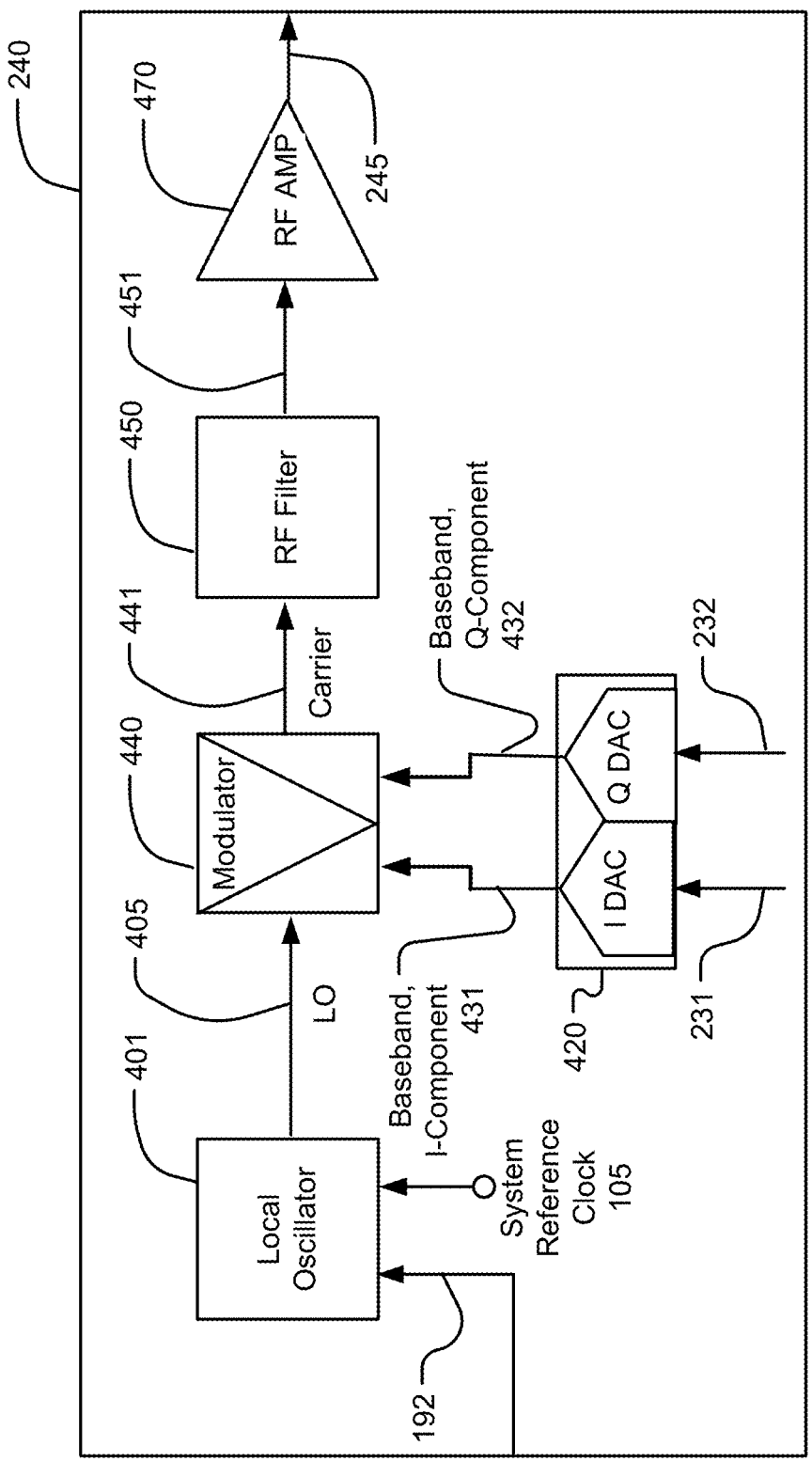
FIG. 4 is a simplified diagram illustrating the Signal Modulation portion of a channel bank, as shown in FIG. 2.

FIG. 4 is a simplified diagram illustrating the Signal Modulation portion of a channel bank, as shown in FIG. 2.

Digital to analogue converters (I DAC, Q DAC) (e.g. 420) in the Signal Modulation Block first convert the complex digital baseband signals (e.g. 231 and 232) received from the Digital Signal Processing Block (e.g. 230) in the channel bank into analogue baseband signals (e.g. 431, 432). A complex signal as used in the present application refers to a signal with two components: in-phase and in-quadrature. The complex signal can be a digital or analogue signal and is used to represent a vector, having a magnitude and phase. A complex signal can be used to represent the output of a local oscillator or modulating baseband signal.

A local oscillator (e.g. 401) generates a LO signal (e.g. 405). The channel bank aligner 180 sends a signal 192 to the channel banks to set the LO frequency in Signal Modulation Blocks in the channel banks to a value depending on the carrier frequency being generated. The frequency the LO is set to is close to the carrier frequency. An analogue modulator (e.g. 440) then offsets the LO frequency to create the carrier frequency. This process applies the Doppler frequency offset, accounting for the frequency offset created by the relative movement of the satellite and receiver.

The analogue modulator (e.g. 440) modulates the LO signal with the complex analogue baseband signals to produce an RF carrier signal (e.g. 441). The analogue modulator (e.g. 440) can be from the ADL537x FMOD series of Analog Devices or a similar device by another manufacturer. The RF carrier signal contains the same information as the digital baseband signals at 0 Hz but at a different frequency (e.g. 1575 MHz). An RF filter (e.g. 450) filters the RF carrier signal to produce a filtered RF signal (e.g. 451). The RF filter is a band pass filter that allows frequencies 1145-1625 MHz for example. This filter rejects out-of-band spurious signals and harmonics from digital signal processing clocks, for example. An RF amplifier (e.g. 470) amplifies the filtered RF signal 451 to produce the RF output 245. The RF output 245 experiences a delay through a chain of electronic and electrical components starting in a channel bank where a digital data signal at baseband is converted to the analogue domain by the digital to analogue converters (DAC). The delay can include delay through the Digital Signal Processing Block (e.g. 230) and the Signal Modulation Block (e.g. 240) in a channel bank. An instance of the channel bank can be channel bank 120 as shown in FIG. 1, and the RF output 245 can be connected to the RF signal 130 at an output of the channel bank 120.

Several nonideal aspects of modulator performance can occur, including I and Q signal path gain mismatch, phase error and local oscillator (LO) feedthrough. I and Q signal path gain mismatch can occur due to small offset and linearity errors in the analogue circuits of the DACs, also in the reconstruction filters that fit between the DACs and the modulator. The modulator I and Q inputs can also have a gain mismatch I/Q Amplitude Balance typically 0.07 dB, caused by manufacturing tolerances in the modulator analogue signal processing circuits.

IQ Gain Error

Consider first what happens if for some reason the gain of the I path is greater than that of the Q channel; this could be caused by a DAC gain mismatch, reconstruction filter insertion loss, mismatch, or gain imbalance inside the IQ modulator. Regardless of where this gain imbalance comes from, its effect is the same. Because the 0°/180° vectors at the output of the I multiplier are larger than the +90°/−90° vectors from the Q multiplier, the shape of the constellation becomes rectangular.

Phase Error

In most IQ modulators, the 90° phase split of the LO is achieved using either a polyphase filter or a divide-by-two flip-flop circuit (which requires an external LO that is twice the desired output frequency). In either circuit, the 90° phase split or quadrature is never perfect. For example, if there is a 1° quadrature error, the shape of the resulting constellation is slightly trapezoidal.

IQ Gain and Phase Errors

Within the quadrature modulator the positive sidebands add constructively whilst the negative sidebands cancel, leaving one sideband only. Imperfections introduced by IQ gain errors or quadrature phase errors cause the negative sideband to not completely cancel, the effect in the frequency domain of the modulated signal is generation of an image signal.

Lo Feedthrough

Now consider what happens if either the I or Q paths have unwanted dc offset errors. This results in the +1/−1 multiplication being skewed. For example, an offset that is equal to 1% of the baseband signal amplitude causes the +1/−1 multipliers to be modified to +1.01/−0.99. This has the effect of shifting the center of the constellation off the origin, on either the I or Q axis, most likely in both. In the frequency domain, this manifests itself as a small portion of the unmodulated LO appearing at the output of the modulator. In the frequency domain, this LO leakage (also referred to as LO feedthrough) appears at the center of the modulated spectrum. The unwanted dc offset errors, as well as coupling from its LO port to the signal ports, can lead to significant spectral spurs at the frequency of the quadrature modulator LO. This LO feedthrough results from minute dc offsets that occur on the differential baseband inputs.

Because of parasitic capacitances within the silicon die and bond-wire to bond-wire coupling, the signal that is applied to the LO port of the IQ modulator may also couple directly to the RF output. This leakage is independent of the offset multiplication effect that was described previously. However, its manifestation, that is, the presence of the unmodulated carrier in the output spectrum, is exactly the same. Thus, the net LO leakage seen at the output of the IQ modulator is the vector sum of these two components.

Figure 5:
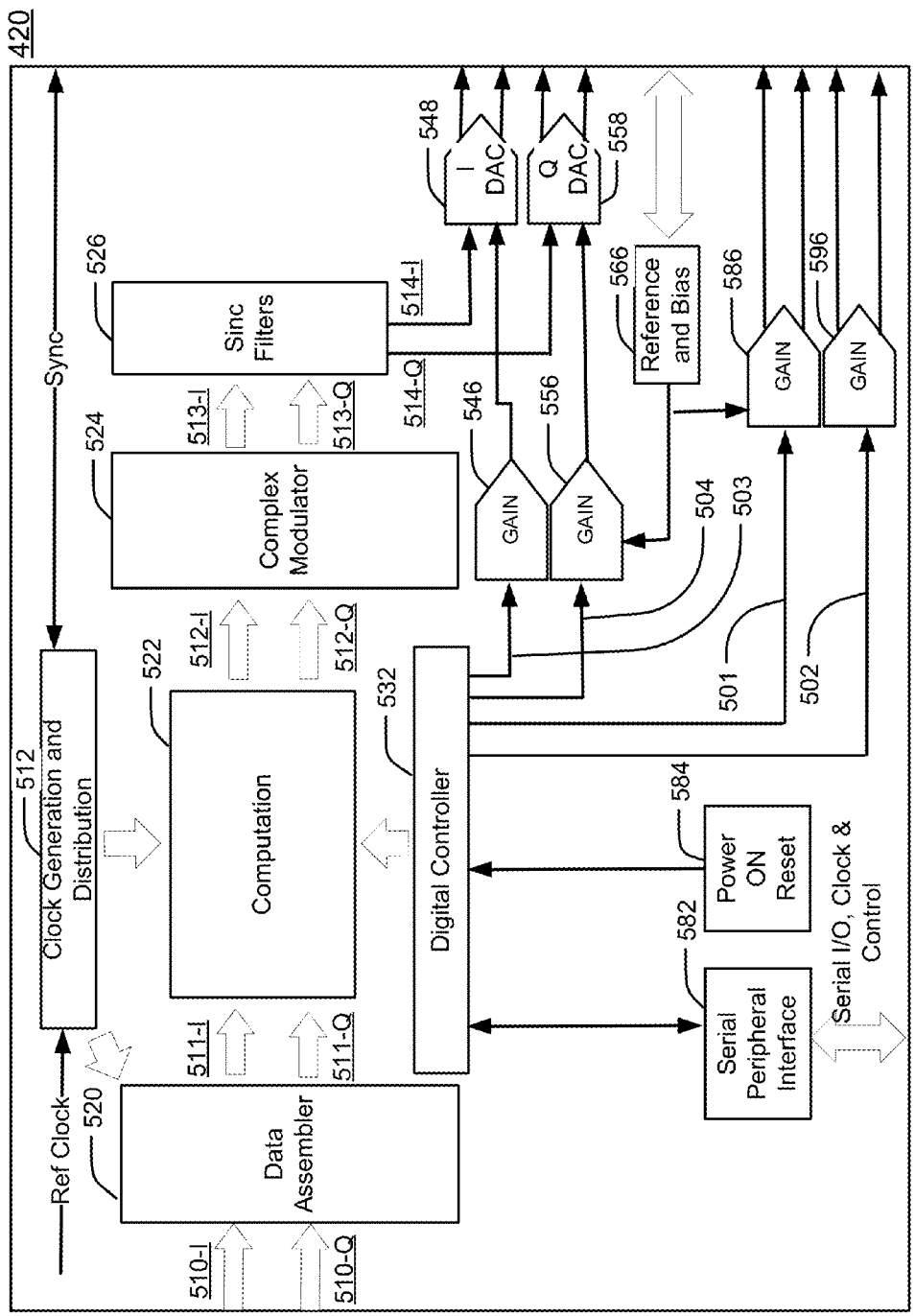
FIG. 5 is a simplified digital to analogue converter functional block diagram as shown in FIG. 4.

FIG. 5 shows a functional block diagram of digital to analogue converter (e.g. 420), which can be an Analog Devices AD9776A/AD9778A/AD9779A or a similar device by another manufacturer. Clock generation and distribution 512 synchronizes activity by the data assembler 520 and computation block 522.

Multiple-bit data input signals 510-I and 510-Q are provided to data assembler 520, for I and Q components of a digital complex signal. Data input signals 510-I and 510-Q are processed by data assembler 520, computation block 522, complex modulator 524, and optionally digital inverse sinc filters 526, through data paths 511-I and 511-Q, 512-I and 512-Q, 513-I and 513-Q, and 514-I and 514-Q. In signal processing, a sinc filter is an idealized filter that removes all frequency components above a given cutoff frequency, without affecting lower frequencies, and has linear phase response. The filter's impulse response is a sinc function in the time domain, and its frequency response is a rectangular function. The processed signals are provided to I-component DAC (e.g. 548) and Q-component DAC (e.g. 558). I-component DAC (e.g. 548) and Q-component DAC (e.g. 558) can have differential outputs.

Power-on reset circuit 584 detects the power applied to the digital to analogue converter (DAC), and generates a reset impulse that goes to components in the DAC, placing the components including digital controller 532 into known states. Serial peripheral interface 582 provides communication between the DAC and control signals external to the DAC. The interface can allow read and write access to registers that configure the DAC. For instance, the digital controller can include gain registers for adjusting gains of I-component DAC (e.g. 548) and Q-component DAC (e.g. 558). Multiple-bit digital signals 501, 502, 503, and 504 connect respective gain registers to control gain blocks 546 and 556, and auxiliary DACs 586 and 596. For instance, the digital signals 501, 502, 503, and 504 can be 10-bit wide. The digital controller 532 can adjust gains for I-component DAC (e.g. 548) and Q-component DAC (e.g. 558) by controlling the gain blocks 546 and 556. The gain blocks can also be referred to as current scaling blocks. An external resistor sets the maximum full scale I and Q DAC currents through the reference and bias block 566.

I/Q channel gain matching in the modulator (e.g. 440) can be achieved by adjusting the values in the DAC gain registers. To perform gain compensation, the value of a gain register for one of I-component DAC (e.g. 548) and Q-component DAC (e.g. 558) can be raised or lowered by a fixed step size, and the amplitude of the unwanted image can be measured. If the unwanted image is increasing in amplitude, another of I-component DAC (e.g. 548) and Q-component DAC (e.g. 558) can be raised or lowered by a fixed step size. The process can be repeated automatically and iteratively until the unwanted image cannot be decreased anymore, as controlled by the process element 250. In one implementation, to minimize the LO feedthrough, the DAC offsets are adjusted using the auxiliary DACs for I and Q components. A first search pattern involves incrementing one of the DAC offsets and monitoring the LO feedthrough. If the LO feedthrough level goes down, then the offset of the DAC is incremented again and the LO feedthrough level is re-checked. If the LO feedthrough level goes up, then the offset of the DAC is decremented and the LO feedthrough level is re-checked. When a minimum of the LO feedthrough level is achieved, the process is switched to and repeated on the other DAC. The minimum of the LO feedthrough level can be maintained by switching between the two DACs. Each time the offset of a DAC is incremented or decremented, a period of settling time, such as 500 milliseconds (ms), is allowed before reading the LO feedthrough level.

Figure 6:
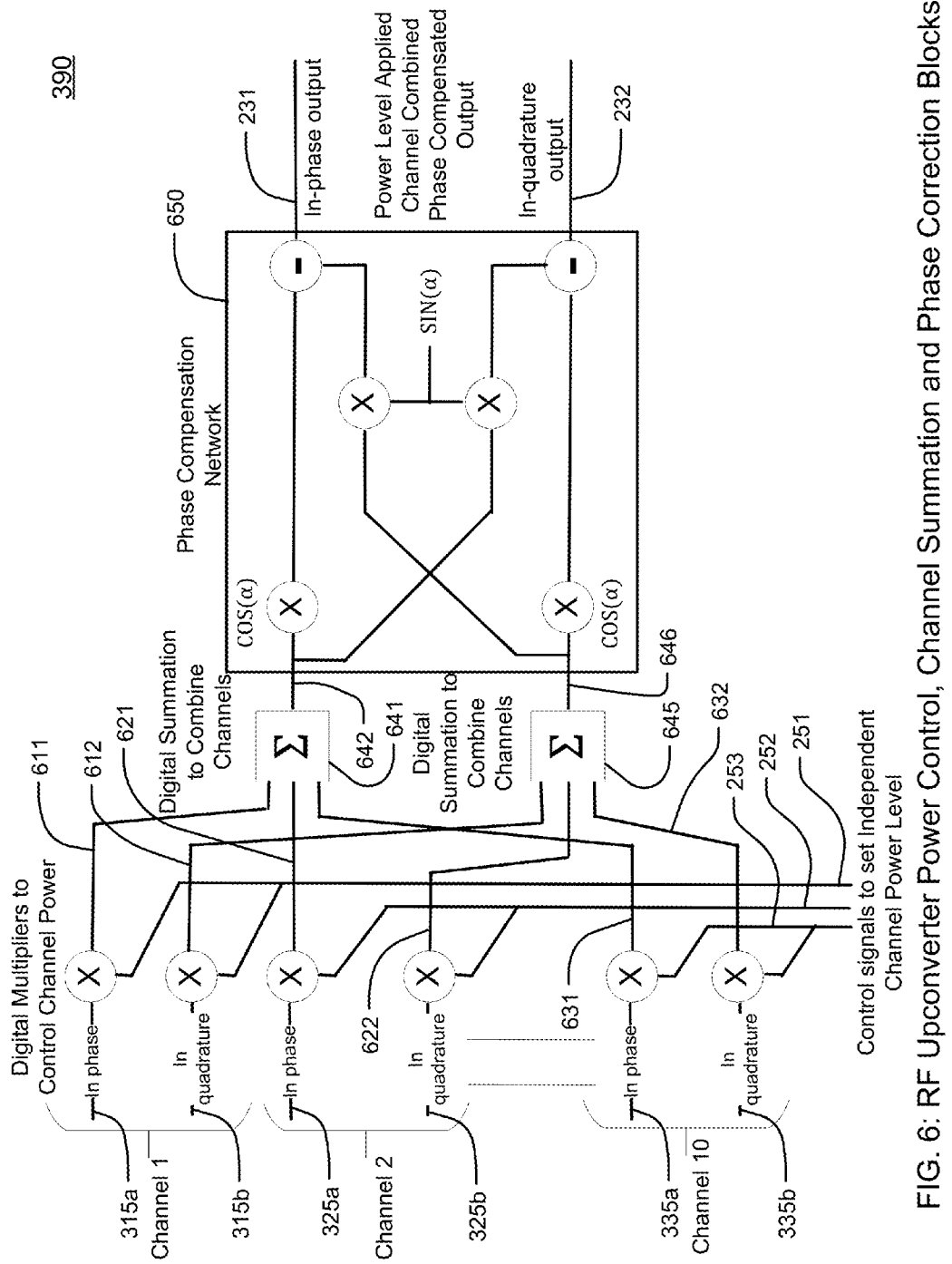
FIG. 6 is a simplified diagram illustrating example RF power control, channel summation and phase correction blocks, contained within the channel summation block of FIG. 3.

FIG. 6 is a simplified diagram illustrating example RF power control, channel summation and phase correction blocks, contained within the channel summation block of FIG. 3. Digital multipliers multiply digital complex data signal at baseband from baseband generators by control signals to set independent channel power levels for respective channels. Control signals (e.g. 251, 252, 253) can be used to set independent channel power levels for Channel 1, Channel 2 and Channel 10, respectively.

For instance, to set channel power level for Channel 1 produced by a first baseband generator (e.g. 314), in-phase and in-quadrature components (e.g. 315a, 315b) of a digital complex data signal in Channel 1 are multiplied by control signal 251. Similarly, to set channel power level for Channel 2 produced by a second baseband generator (e.g. 324), in-phase and in-quadrature components (e.g. 325a, 325b) of a digital complex data signal in Channel 2 are multiplied by control signal 252. To set channel power level for Channel 10, in-phase and in-quadrature components (e.g. 335a, 335b) of a digital complex data signal in Channel 10 are multiplied by control signal 253.

A first digital summation circuit (e.g. 641) sums products of multiplying in-phase components by respective control signals (e.g. 611, 621, 631) to produce an in-phase sum of products (e.g. 642). A second digital summation circuit (e.g. 645) sums products of multiplying in-quadrature components by respective control signals (e.g. 612, 622, 632) to produce an in-quadrature sum of products (e.g. 646).

In the phase compensation network (e.g. 650), one or more pairs of cosine and sine multiplication factors can be applied to modify amplitude ("I") and quadrature ("Q") components in a multi-satellite GNSS emulation signal, whereby a phasor in a polar IQ diagram is rotated. A phasor, also known as a phase vector, includes amplitude and phase. The amplitude ("I") and quadrature ("Q") components can be represented by the in-phase sum of products (e.g. 642) and the in-quadrature sum of products (e.g. 646). The phase compensation network 650 receives the in-phase sum of products (e.g. 642) and the in-quadrature sum of products (e.g. 646) to produce a complex digital baseband signal including in-phase output (e.g. 231) and in-quadrature output (e.g. 232) that are power level applied, channel combined, and phase compensated. The in-phase output and in-quadrature output can be expressed as:

$$\text{In-Phase Output} = \text{In-Phase} \times \cos(\alpha) - \text{In-Quadrature} \times \sin(\alpha)$$

$$\text{In-Quadrature Output} = \text{In-Quadrature} \times \cos(\alpha) - \text{In-Phase} \times \sin(\alpha)$$

where the input $\alpha$ is the phase angle by which the phase compensation network rotates the signal vector, In-Phase is the in-phase sum of products (e.g. 642), and In-Quadrature is the in-quadrature sum of products (e.g. 646).

When the spurious suppression algorithm minimizes the image signal component, the processing element 250, such as a Microblaze soft processor core implemented in an FPGA, calculates the sine and cosine of $\alpha$, creating the inputs to the multipliers as digital signals within the FPGA fabric. In one implementation, the FPGA fabric can be surrounding the processing element within the same FPGA. The algorithm iteratively changes $\alpha$ within a range such as +/−2 degrees, searching for the minimum image level.

The disclosed technology addresses imperfections within the analogue signal processing of the Signal Modulation Block, to suppress spurious signals. One imperfection is feedthrough of the local oscillator (LO) through the analogue modulator. Another imperfection, phase error, is introduced by the analogue modulator, causing an unwanted image frequency component.

Figure 7:
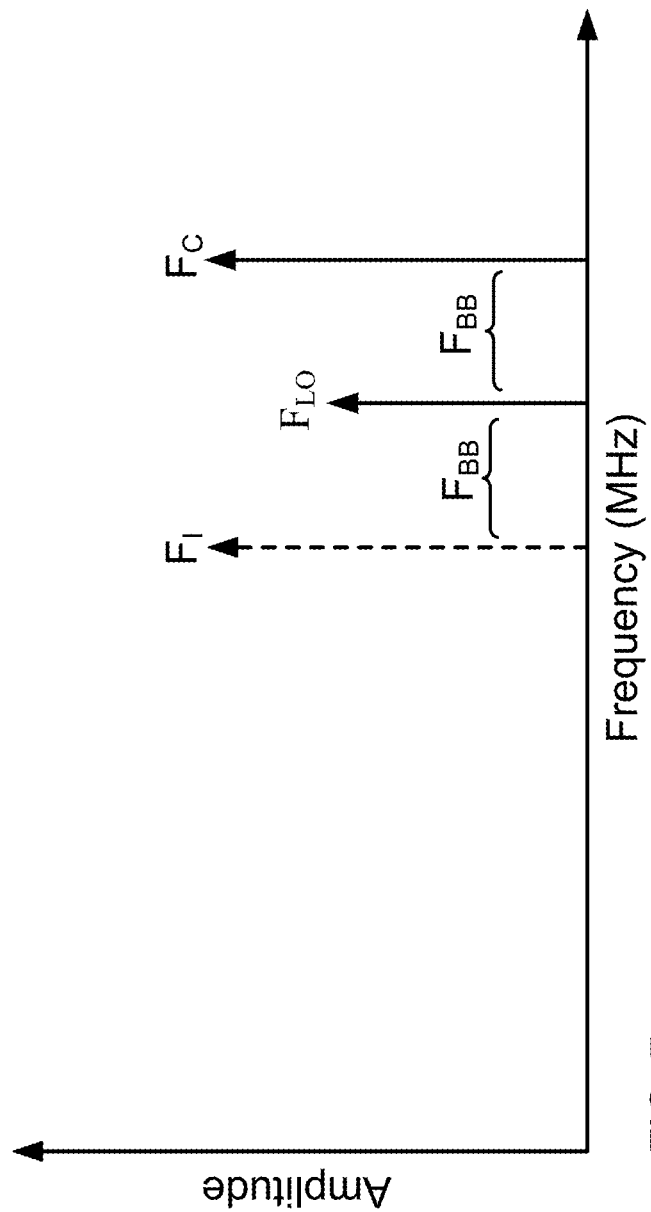
FIG. 7 is a diagram illustrating frequency components generated by a modulator.

FIG. 7 is a diagram illustrating frequency components generated by a modulator. A modulator (e.g. 440, FIG. 4) generates two frequency components, a carrier frequency $F_C$ and an image frequency $F_I$:

$$F_C = F_{LO} + F_{BB}$$

$$F_I = F_{LO} - F_{BB}$$

where $F_{LO}$ is the local oscillator frequency and $F_{BB}$ is the base band frequency. As illustrated in FIG. 7, the carrier frequency $F_C$ is the sum of the local oscillator frequency $F_{LO}$ and the base band frequency $F_{BB}$. The image frequency $F_I$ is the difference of the local oscillator frequency $F_{LO}$ and the base band frequency $F_{BB}$. Both the carrier frequency $F_C$ and the image frequency $F_I$ are modulated versions of the local oscillator frequency $F_{LO}$. The modulator is designed to reject the image frequency. However in practical systems an image frequency is created due to imperfections in the analogue signal paths of the modulator and associated components.

Figure 8A:
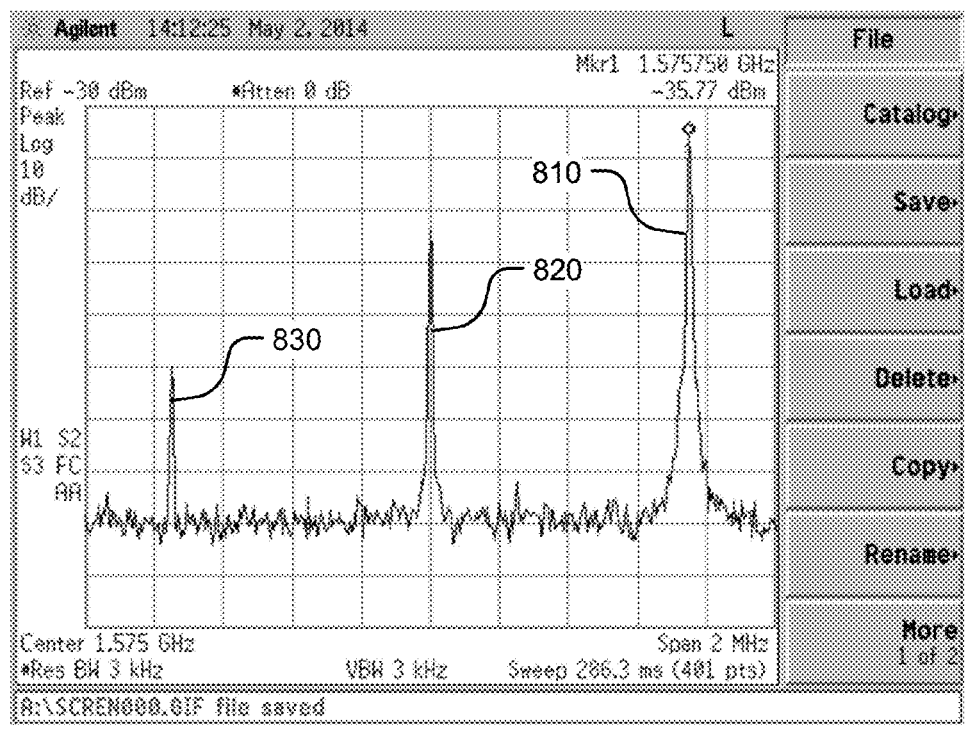
FIG. 8A is spectrum plot illustrating a signal with a carrier, local oscillator feedthrough and image component before spurious suppression.

FIG. 8A is a spectrum plot illustrating a signal with a carrier, local oscillator feedthrough and image component before spurious suppression. A spectrum plot or a frequency domain plot can be captured on a spectrum analyzer. The spectrum plot has frequency on the horizontal axis and the magnitude on the vertical axis. The vertical axis displays the power in dBm, abbreviated from decibels with respect to 1 mW (milli-watt). A decibel is a logarithmic scale used to express the ratio between two values of a physical quantity.

Figure 8B:
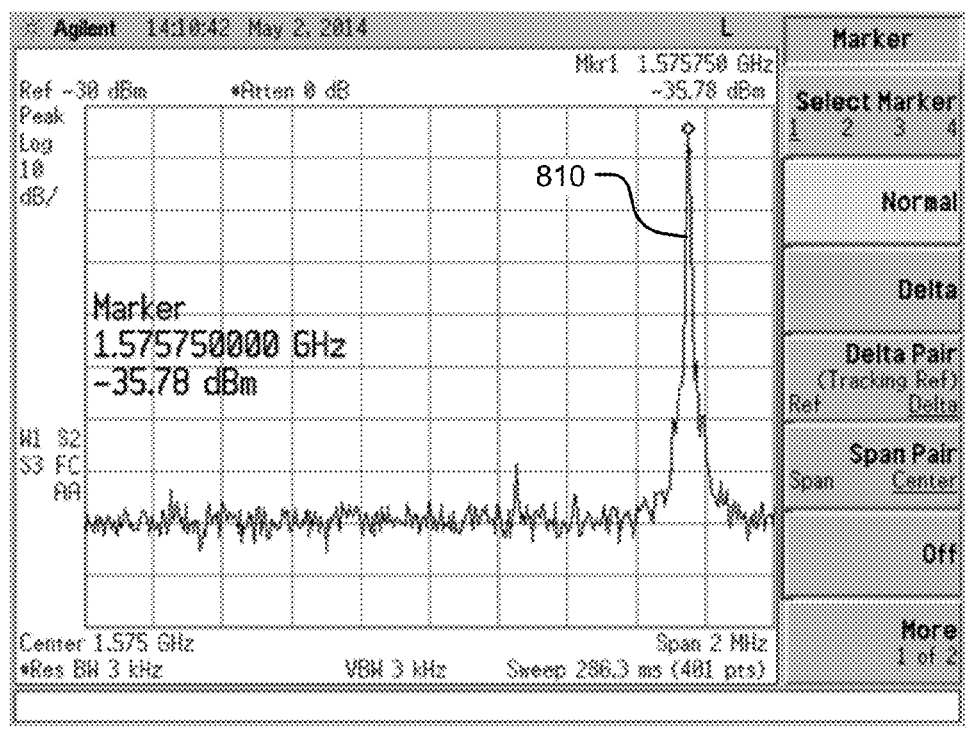
FIG. 8B is spectrum plot illustrating a signal with a carrier, local oscillator feedthrough and image component after spurious suppression.

A carrier frequency 810 is shown at 1.575750 GHz, along with unwanted signals 820 and 830. Signal 820 is the local oscillator feedthrough at 1.575 GHz and signal 830 is the image frequency at 1.57425 GHz, generated by imperfections of the modulation process. FIG. 8B is a spectrum plot illustrating the carrier frequency signal with local oscillator feedthrough and image frequency components (820 and 830) suppressed.

Analogue I and Q signals 431 and 432 are differential and are therefore not affected by common mode DC bias levels. LO feedthrough can be influenced by minute DC offsets applied to the differential baseband inputs of an IQ modulator 440. Applying these intentional amplitude offsets to the differential signals nulls the LO feedthrough that couples across the modulator and also compensates for differential amplitude offsets caused by imperfections in the DAC and modulator IQ amplitude balance.

A test utility is used to monitor the performance of the nulling process. In the four graphs discussed below (FIGS. 9A, 9B, 10A and 10B), the left hand plot is a vector plot with the real component on the X axis and the imaginary component on the Y axis. The plot on the right shows the LO feedthrough or image level with time on the X axis and magnitude on the Y axis. The test utility can allow manual adjustment and automatic monitoring to evaluate the performance.

Figure 9A:
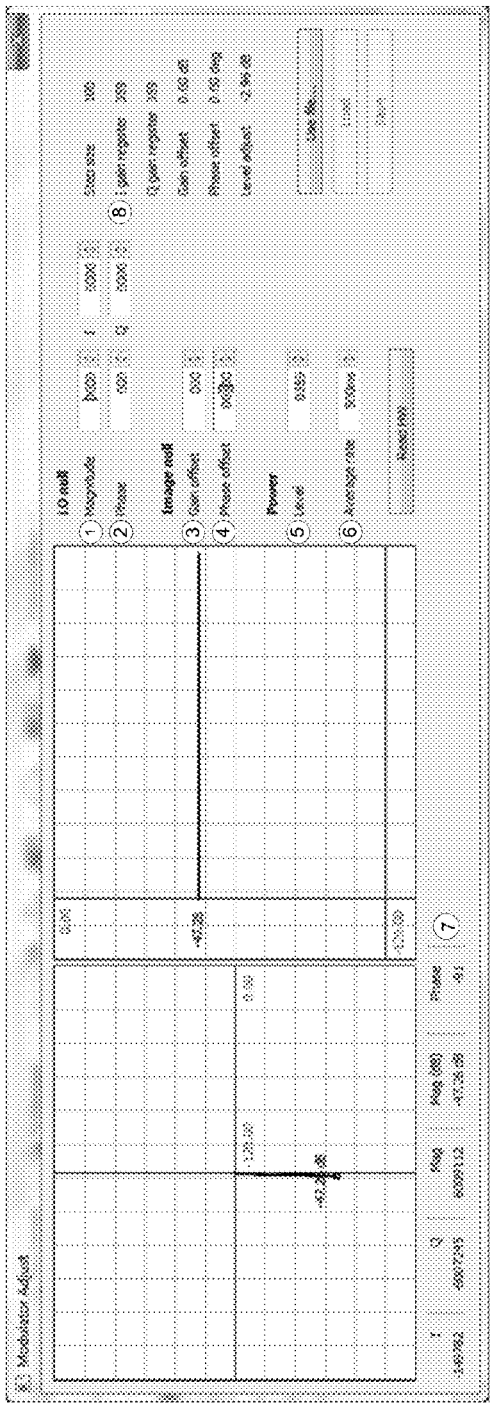
FIG. 9A shows an example LO signal as a vector (phase and magnitude) and magnitude vs time before spurious suppression.

FIG. 9A shows an example LO signal as a vector (phase and magnitude) and magnitude vs time before spurious suppression. The LO null control register values for both magnitude and phase are zero (circled 1 and 2) on the simulator. The magnitude and phase values and I and Q parameter values (circled 7) are shown beneath the graphs. The LO feedthrough shown in the left graph is −47.26 dB.

Nulling LO feedthrough is a multistep process. Initially, with the I-channel offset held constant (at 0 mV), the Q-channel offset is varied until a minimum LO feedthrough level is obtained. This Q-channel offset voltage is then held constant, while the offset on the I-channel is adjusted until a new minimum is reached. Through iterations of this process, the LO feedthrough can be reduced.

Figure 9B:
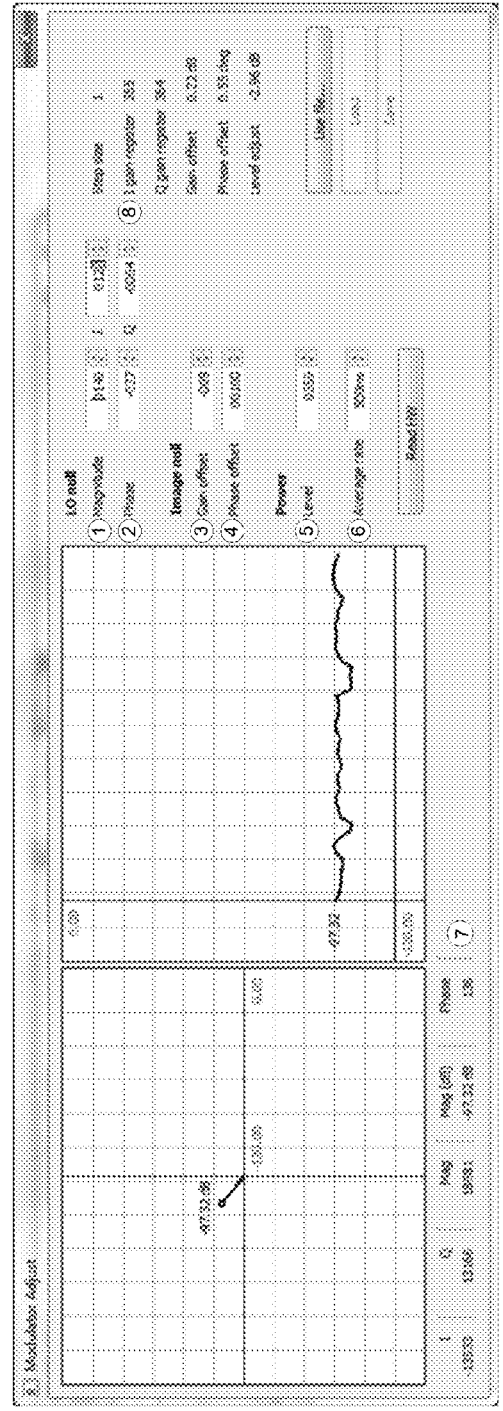
FIG. 9B shows an example LO signal as a vector (phase and magnitude) and magnitude vs time after spurious suppression.

FIG. 9B shows an example LO signal as a vector (phase and magnitude) and magnitude vs time after spurious suppression. Image null control register values are provided in both rectangular I and Q coordinates, and magnitude and phase coordinates (circled 1 and 2). After nulling, the LO is nearly noise. The LO feedthrough is unrecognizable.

The power level is shown in the Power Level (circled 5) register. When the carrier frequency is adjusted, the power level needs to be adjusted as well. Optimal null values can be identified for each carrier frequency of interest.

Figure 10A:
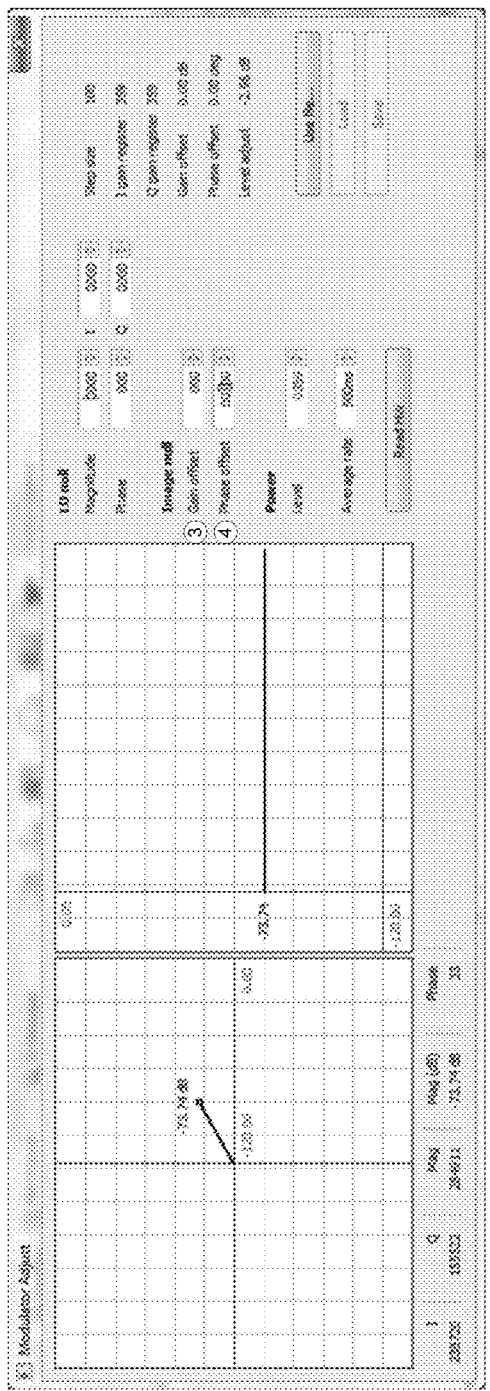
FIG. 10A shows an example image signal as a vector (phase and magnitude) and magnitude vs time before spurious suppression.
Figure 10B:
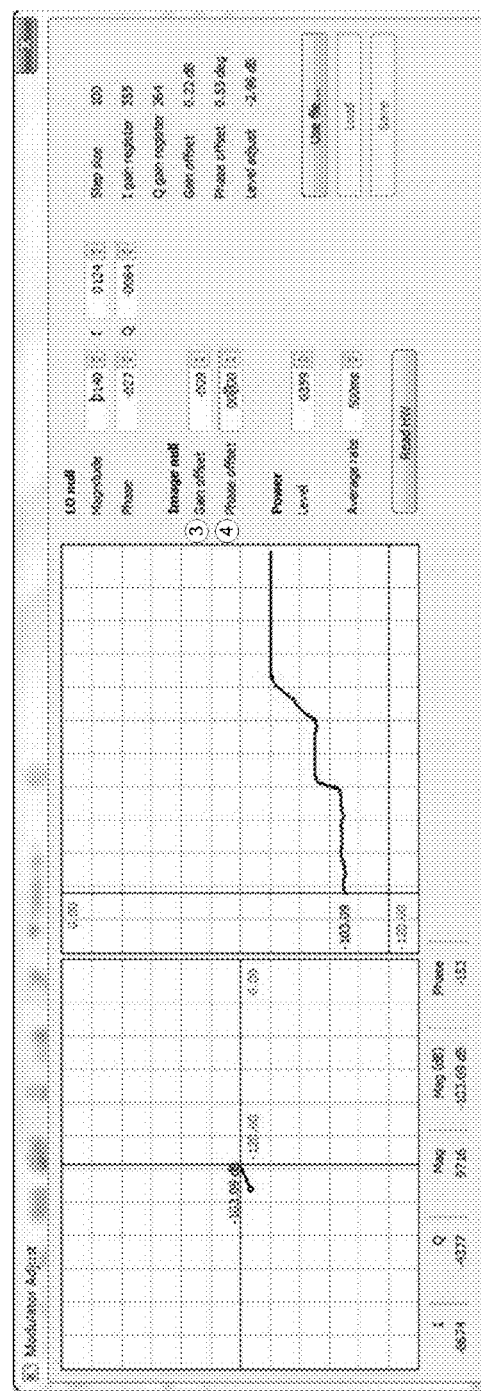
FIG. 10B shows an example image signal as a vector (phase and magnitude) and magnitude vs time after spurious suppression.

FIG. 10A shows an example image signal as a vector (phase and magnitude) and magnitude vs time before spurious suppression. The gain offset (circled 3) and phase offset (circled 4) values can be adjusted to minimize unwanted image components. FIG. 10B shows an example image signal as a vector (phase and magnitude) and magnitude vs time after spurious suppression. The image frequency is barely visible, with a signal of less than −100 dB.

The disclosed automatic nulling process operates continuously, minimizing both LO feedthrough and image frequency components, to compensate for changing conditions such as ambient temperature or equipment warming up. Other effects include component aging. Also if a channel bank is reconfigured to a different carrier frequency, the RF Upconverter can recall its best set of parameter values that were used the last time that carrier frequency was selected. It then works to further improve on this performance.

The GSS9000 GNSS Simulator manufactured by Spirent Communications plc can support the flexibility to change GNSS constellation type/frequency on a scenario-by-scenario basis. The system also could accept in-field upgrade through the addition of channel banks and enabling of additional signal types on existing channel banks. However, these options cannot reasonably be implemented without an improvement in spurious artefact suppression procedures. Without an improvement, in-field spurious artefact suppression for multiple channel banks would be unmanageable.

For instance, with a prior generation of GNSS simulator, such as the GSS8000 manufactured by Spirent Communications plc, only three modulators were used and these modulators were at fixed frequencies. Therefore at annual calibration, LO feedthrough and image frequency suppression was only performed three times, once for each modulator. However, in the GSS9000 there are 10 modulators, one per channel bank, and each channel bank supports 10 carrier frequencies. Accordingly, there are 100 sets of parameters that need to be optimized in the system. Furthermore, additional constellations and carrier frequencies can be added in the field as the GSS9000 GNSS Simulator is reconfigurable. Consequently, without the improvement disclosed in the present specification, it would be unmanageable to calibrate the sets of parameters in the GSS9000 GNSS Simulator.

Figure 11:
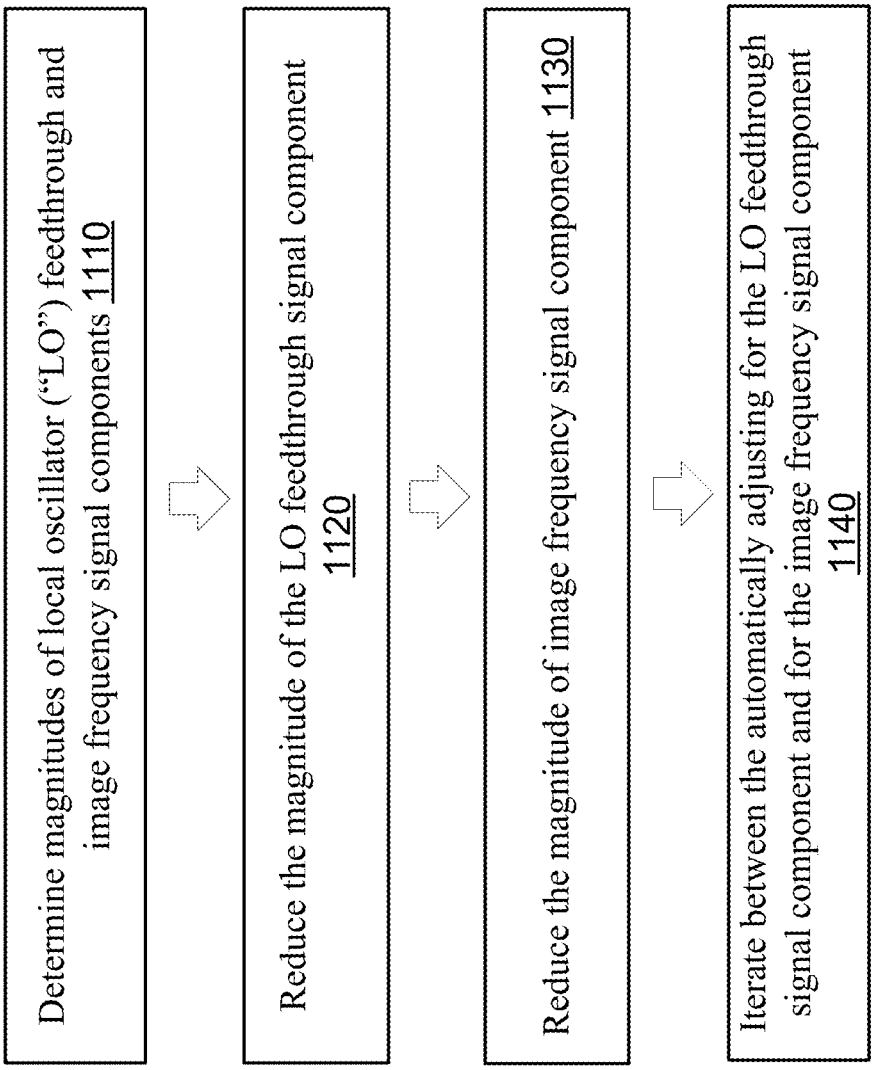
FIG. 11 is a flow diagram of a method for suppressing spurious signals.

FIG. 11 is a flow diagram of an automated method for suppressing spurious signals in a direct digital synthesized signal. To determine magnitudes of local oscillator ("LO") feedthrough and image frequency signal components 1110, digitally analyze a digitally synthesized RF signal. To reduce the magnitude of the LO feedthrough signal component for the LO feedthrough signal component 1120, automatically adjust one or more first parameters of at least one digital-to-analogue converter following a first search pattern. To reduce the magnitude of image frequency signal component for the image frequency signal component 1130, automatically adjust at least one second parameter of the at least one digital-to-analogue converter and automatically adjust at least one third parameter of a phase compensation network following a second search pattern. The automatically adjusting for the LO feedthrough signal component and for the image frequency signal component can be iterated 1140.

While the technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An automated method of suppressing spurious signals in a direct digital synthesized signal, wherein the spurious signals include a local oscillator ("LO") feedthrough signal component and an image frequency signal component, including:

digitally analyzing a digitally synthesized RF signal to
determine magnitudes of the local oscillator ("LO")
feedthrough signal component and the image frequency
signal component, using an integrated circuit;
for the LO feedthrough signal component, using the
integrated circuit to automatically adjust one or more
first parameters of at least one digital-to-analogue converter using a first search pattern to reduce the magnitude of the LO feedthrough signal component;
for the image frequency signal component, using the
integrated circuit to automatically adjust at least one
second parameter of the at least one digital-to-analogue
converter and adjusting at least one third parameter of
a phase compensation network using a second search
pattern to reduce the magnitude of the image frequency
signal component; and
iterating between the automatically adjusting for the LO
feedthrough signal component and for the image frequency signal component.

2. The automated method of claim 1, further including:
automatically adjusting amplitude and quadrature offset
parameters of at least one digital-to-analogue converter
using the first search pattern to reduce the magnitude of
the LO feedthrough signal component; and
automatically adjusting a gain difference between in-phase and in-quadrature baseband signal paths using
gain blocks within the digital-to-analogue converter
and adjusting a phase parameter of the phase compensation network using the second search pattern to
reduce the magnitude of the image frequency signal
component.

3. The automated method of claim 1, wherein the phase
compensation network modifies digital amplitude ("I") and
quadrature ("Q") components supplied to at least one digital-to-analogue converter and used to generate the digitally
synthesized RF signal.

4. The automated method of claim 1, wherein the first
parameters include amplitude and quadrature offset parameters.

5. The automated method of claim 1, wherein the second
parameter includes a gain difference between in-phase and
in-quadrature signal components.

6. The automated method of claim 1, wherein the third
parameter includes one or more pairs of cosine and sine
multiplication factors.

7. The automated method of claim 1, wherein the one or
more first parameters includes an offset, and the first search
pattern includes iteratively adjusting the offset to reduce the
magnitude of the LO feedthrough signal component towards
a minimum of the magnitude.

8. The automated method of claim 1, wherein the at least
one second parameter includes a gain offset between in-phase and in-quadrature components of the digitally synthesized RF signal, and the second search pattern includes
iteratively adjusting the gain offset to minimize the image
frequency signal component.

9. The automated method of claim 1, wherein the iterating
includes rotating a phase of the digitally synthesized RF
signal to compensate for a phase error in the analogue signal
processing chain of the digitally synthesized RF signal.

10. The automated method of claim 1, further including
receiving a multi-satellite GNSS emulation signal as the
digitally synthesized RF signal.

11. The automated method of claim 10, further including
detecting that a carrier wave channel frequency of the GNSS
emulation signal has been reset and automatically initiating
the automated method of claim 10.

12. The automated method of claim 10 applied to multiple
channel banks, further including independently applying the
automated method of claim 10 to each digitally synthesized
RF signal received from a channel bank in a plurality of
channel banks and mixing the digitally synthesized RF
signals after automatically adjusting for the LO feedthrough
signal component and for the image frequency signal component in each of the digitally synthesized RF signals in the
plurality of channel banks.

13. The automated method of claim 10, further including
applying one or more pairs of cosine and sine multiplication
factors in the phase compensation network to modify amplitude ("I") and quadrature ("Q") components the multi-satellite GNSS emulation signal, whereby a phasor in a polar
IQ diagram is rotated.

14. The automated method of claim 1, wherein the at least
one digital-to-analogue converter and the phase compensation network are used to generate the digitally synthesized
RF signal.

15. The automated method of claim 1, wherein the phase
compensation network modifies digital amplitude ("I") and
quadrature ("Q") components supplied to the at least one
digital-to-analogue converter and used to generate the digitally synthesized RF signal.

16. A system for automatically suppressing spurious signals in a direct digital synthesized signal, wherein the
spurious signals include a local oscillator ("LO")
feedthrough signal component and an image frequency
signal component, comprising:
control logic, using an integrated circuit, performing a
spurious signal suppression process, the spurious signal
suppression process comprising: digitally analyzing a
digitally synthesized RF signal to determine magnitudes of the local oscillator ("LO") feedthrough signal
component and the image frequency signal component,
for the LO feedthrough signal component, automatically adjusting one or more first parameters of at least
one digital-to-analogue converter using a first search
pattern to reduce the magnitude of the LO feedthrough
signal component, for the image frequency signal component, automatically adjusting at least one second
parameter of the at least one digital-to-analogue converter and adjusting at least one third parameter of a
phase compensation network using a second search
pattern to reduce the magnitude of the image frequency
signal component, and iterating between automatically
adjusting for the LO feedthrough signal component and
for the image frequency signal component.

17. The system of claim 16, the control logic configured
to perform the spurious signal suppression process further
comprising:
automatically adjusting amplitude and quadrature offset
parameters of at least one digital-to-analogue converter
using the first search pattern to reduce the magnitude of
the LO feedthrough signal component; and
automatically adjusting a gain difference between in-phase and in-quadrature baseband signal paths using
gain blocks within the digital-to-analogue converter
and adjusting a phase parameter of the phase compensation network using the second search pattern to
reduce the magnitude of the image frequency signal
component.

18. The system of claim 16, wherein the phase compensation network modifies digital amplitude ("I") and quadrature ("Q") components supplied to at least one digital-to-analogue converter and used to generate the digitally
synthesized RF signal.

19. The system of claim 16, wherein the first parameters include amplitude and quadrature offset parameters.

20. The system of claim 16, wherein the second parameter includes a gain difference between in-phase and in-quadrature signal components.

21. The system of claim 16, wherein the third parameter includes one or more pairs of cosine and sine multiplication factors.

22. The system of claim 16, wherein the one or more first parameters includes an offset, and the first search pattern includes iteratively adjusting the offset to reduce the magnitude of the LO feedthrough signal component towards a minimum of the magnitude.

23. The system of claim 16, wherein the at least one second parameter includes a gain offset between in-phase and in-quadrature components of the digitally synthesized RF signal, and the second search pattern includes iteratively adjusting the gain offset to minimize the image frequency signal component.

24. The system of claim 16, wherein the iterating includes rotating a phase of the digitally synthesized RF signal to compensate for a phase error in the analogue signal processing chain of the digitally synthesized RF signal.

25. The system of claim 16, the control logic configured to perform the spurious signal suppression process further comprising receiving a multi-satellite GNSS emulation signal as the digitally synthesized RF signal.

26. The system of claim 25, the control logic configured to perform the spurious signal suppression process comprising detecting that a carrier wave channel frequency of the GNSS emulation signal has been reset and automatically initiating the spurious signal suppression process.

27. The system of claim 25, including a plurality of channel banks, the control logic configured to perform the spurious signal suppression process further comprising independently applying the spurious signal suppression process to each digitally synthesized RF signal received from a channel bank in the plurality of channel banks and mixing the digitally synthesized RF signals after automatically adjusting for the LO feedthrough signal component and for the image frequency signal component in each of the digitally synthesized RF signals in the plurality of channel banks.

28. The system of claim 25, the control logic configured to apply one or more pairs of cosine and sine multiplication factors in the phase compensation network to modify amplitude ("I") and quadrature ("Q") components the multi-satellite GNSS emulation signal, whereby a phasor in a polar IQ diagram is rotated.

29. The system of claim 16, wherein the at least one digital-to-analogue converter and the phase compensation network are used to generate the digitally synthesized RF signal.

30. The system of claim 16, wherein the phase compensation network modifies digital amplitude ("I") and quadrature ("Q") components supplied to the at least one digital-to-analogue converter and used to generate the digitally synthesized RF signal.

\* \* \* \* \*